C. R. STURDEVANT.
APPARATUS FOR BRAZING OR SIMILAR WORK.
APPLICATION FILED JULY 9, 1910.
1,000,456.
Patented Aug. 15, 1911.
2 SHEETS—SHEET 2.
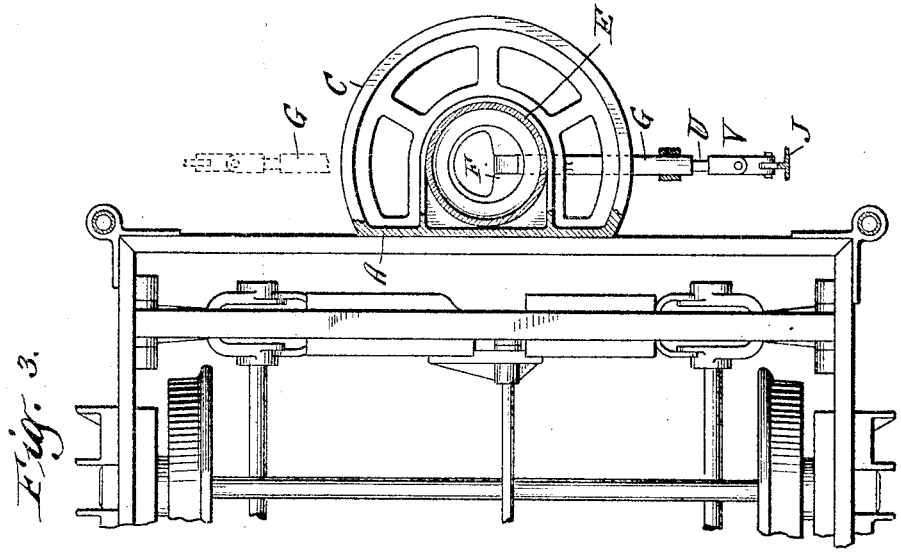
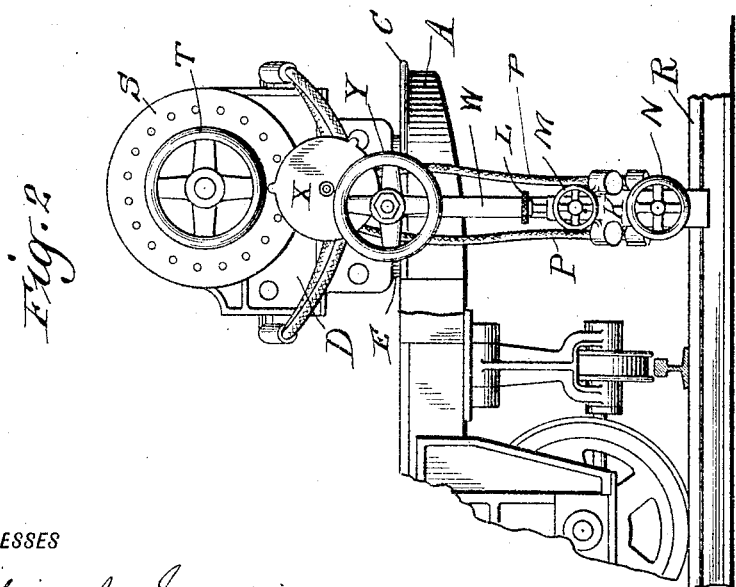

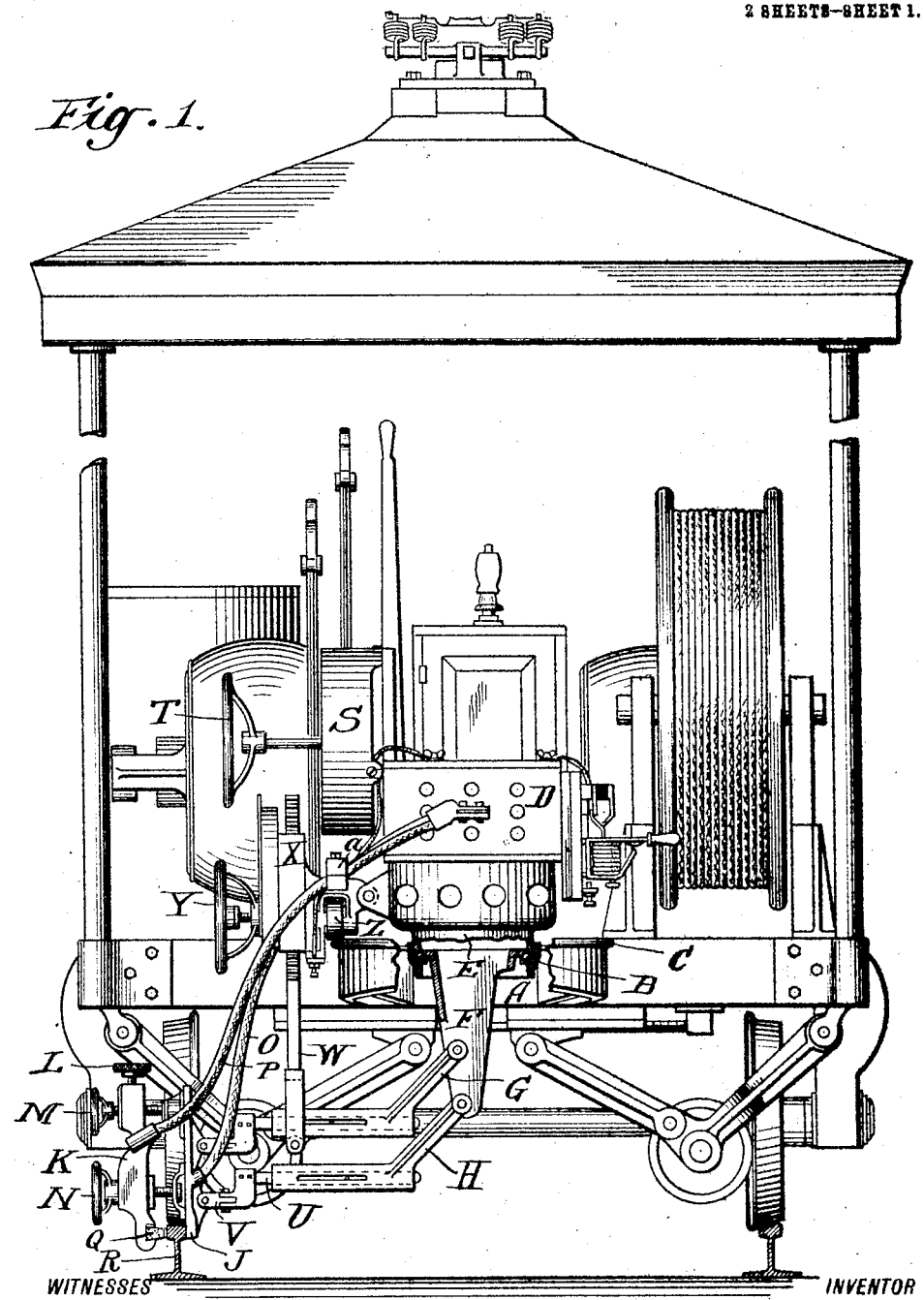

UNITED STATES PATENT OFFICE.

CHARLES R. STURDEVANT, OF WORCESTER, MASSACHUSETTS, ASSIGNOR TO THE AMERICAN STEEL & WIRE COMPANY, OF HOBOKEN, NEW JERSEY, A CORPORATION OF NEW JERSEY.

APPARATUS FOR BRAZING OR SIMILAR WORK.

1,000,456.

Specification of Letters Patent. Patented Aug. 15, 1911.

Application filed July 9, 1910. Serial No. 571,170.

*To all whom it may concern:*

Be it known that I, CHARLES R. STURDEVANT, a citizen of the United States, residing at Worcester, Massachusetts, have invented new and useful Improvements in Apparatuses for Brazing or Similar Work, of which the following is a specification.

This invention aims to provide certain improvements in apparatuses for brazing or similar work and especially for brazing or soldering the terminals of bonds to rails of electric railroads. The entire apparatus is adapted to be mounted on a car and run along a track which is being bonded and the support and other parts of the apparatus are conveniently arranged so that the work may be done with a minimum labor and time and without interference with traffic. The car or other vehicle constitutes the subject matter of a separate application for patent in the name of Edward W. Vaughn pending concurrently herewith and is provided with apparatus for transforming, regulating and conducting the electric current and for various other operations. The present application relates to the apparatus, preferably carried on such a car, for supporting and shifting, adjusting or otherwise manipulating the clamp which holds the bond terminal to the rail and through which the current is applied.

The accompanying drawings illustrate an embodiment of this invention as applied to a car.

Figure 1 is an end elevation, partly in section. Fig. 2 is a side elevation. Fig. 3 is a horizontal section at about the level of the floor of the car.

Referring to the embodiment of the invention illustrated the car carries on its forward end a bracket A comprising an inner circular ball race B and an outer rail C constituting part of a circle concentric with the race B. A transformer D has a base E resting upon the balls in the race B so as to permit the transformer to turn freely about a vertical axis. The base or carrier E of the transformer has a divided leg F extending downward through the bracket A and carrying arms G and H pivotally attached to the leg F and which at their outer ends are connected by pivotal connections to a clamp comprising members J and K. This clamp *per se* is made the subject matter of a separate application for patent pending concurrently herewith (No. 571169, filed July 9, 1910) and is not claimed in the present application except in combination with the other parts of the apparatus. It comprises the two members J and K adapted for relative vertical adjustment by means of the screw L and for relative transverse and angular adjustments by means of the screws M and N.

The members of the clamp are connected by means of cables O and P to opposite poles of the transformer D whereby the brazing current is transmitted from the transformer to the clamp members and thence through the carbon electrode Q and bond terminal and the rail R. The swivel mounting of the transformer and of the leg F permits the clamp to be readily swung about from the rail at one side to that at the opposite side, the weight of the clamp to be shifted being very little so that the work can proceed very expeditiously.

Supported upon the side of the transformer is a field regulator S which controls the alternating current generator voltage by means of a hand wheel T and which turns about a vertical axis with the transformer, thus always being on the side of the transformer adjacent to the clamp. When the clamp is in position on the rail the regulator hand wheel T is directly accessible to the operator so that he can regulate the welding current by regulating the field of the alternator which excites the transformer.

The connection between the clamp and the transformer-carrying base or frame is adapted to be adjusted in several different ways. The first adjustment is a longitudinal extension. For this purpose each of the arms G and H is provided with a tubular portion in which slides a rod U carrying at its end a bracket connected by a vertical pivot with a link V which in turn is connected by a horizontal pivot with the member J of the clamp. The longitudinal adjustment is effected freely by simply pushing the clamp inward or outward until it is approximately in its proper position and then dropping and clamping it to the rail, the sliding connection yielding inward or outward to permit it to adjust itself properly in the clamping operation. The second adjustment is permitted by the horizontal pivot connections at opposite ends of the arms so that the clamp may be lifted and swung over the rail and then dropped down to the desired position, all with a substantially parallel movement. The third adjustment is due to the vertical pivots between the links V and the ends of the rods U, these vertical pivots being approximately in line with each other, whereby the clamp can be turned in a horizontal plane without turning the arms G and H.

The various horizontal movements of the clamp are unrestricted and can be effected simply by pushing or pulling the clamp into position. The clamp can thus be set to the point desired with the greatest and quickest facility. The weight of the clamp is supported and its vertical adjustments quickly effected by means of a rod W connected to the arm G and adapted to be raised or lowered by any suitable means. For example, as shown, the rod is provided with teeth at its upper end forming a rack passing through a casing X in which is a pinion and gearing driven by a hand wheel Y connected by suitable speed reducing gear to the pinion which raises or lowers the rod, so that the rod, and the clamp, will remain in the vertical position of adjustment to which it is set by the hand wheel Y. The casing carrying the gearing is connected to the base or frame E which carries the transformer, and the hand wheel Y is on the side adjacent to the clamp for greater convenience. In order to avoid too great an eccentric load upon the ball race the gear casing X is pivotally connected to the frame E and runs upon the fixed circular track C which surrounds the ball race and is rigidly mounted on the end of the car, an antifriction roller Z being arranged to bear upon the track. The weight of the electric cables O and P is also largely taken off the transformer by fastening an intermediate point of them in the clamps a upon the casing X.

In brazing a rail bond to the rail the clamp is shifted to position and dropped to the proper level to bring the welding carbon Q at the lower end of the clamp arm K against the bond terminal and the clamp arms are adjusted to press them toward the rail. The welding current is then switched on and passes through the carbon and the terminal and the rail from one clamp arm to the other, completing the circuit through the transformer, the carbon becoming white hot by reason of its internal resistance, and the heat of the carbon effecting the brazing of the terminal to the rail. When the operation is completed the clamp arms are loosened and the entire clamp lifted an inch or so to bring it above the rail by means of the hand wheel Y. Supposing the joints in the opposite rails to be staggered the car is then moved along a short distance to the next joint on the opposite rail and the clamp swung around the vertical axis of the bearing ring B and dropped and adjusted for the next brazing operation.

The construction of the pivoted frame E and the flexible cables and flexible connections of the clamp to said frame secure a maximum degree of flexibility and ease of adjustment throughout the entire device. The apparatus provides the very important capacity of quick and easy adjustment of the carbon in any direction so that it can be made to bear squarely and flat against the bond terminal. It is especially important to be able to move the carbon and the clamp arms quickly and easily into almost any planes because the rail, especially at the side of the head, is often beveled to a greater or less degree. Time is also saved and a certain amount of heat energy by reason of the quickness with which the apparatus can be set for the next operation. The white hot carbon is the immediate source of the thermal energy required for brazing. The carbon has considerable mass, and a certain amount of time and electrical energy is required to raise it to a white hot temperature before the brazing action begins. As soon as a brazing operation is completed the current must be cut off and the carbon will tend to cool rapidly; therefore, the sooner the same carbon can be placed in position for the next operation and the current restored the less electrical energy as well as time is required to bring it to a brazing temperature. Thus the use of a single carbon for doing the work on the rails at both sides of the track results in a maximum saving of time and electrical energy as compared with apparatus which have two sets of clamping devices and two carbons, one for each rail. In the latter case the carbon of one clamp becomes quite cold while making a bond with the opposite clamp.

The use of a single device for both rails also lessens the weight of the car equipment as compared with cars carrying two clamps, by eliminating one of the clamping devices and one set of connecting cables.

Another advantage of the described construction is in applying bonds around switches or other special track work, the extensible connection of the clamp to its support permitting the clamp to be pulled outward a considerable distance from the center so as to work upon an adjoining rail without moving the car. That is to say, with the car in any one position, the radius of usefulness is increased on account of the flexibility and extensibility of the connection.

Though I have described with great particularity of detail certain specific embodiments of the invention yet it is not to be understood therefrom that the invention is restricted to the particular embodiments described. Various modifications in detail and in the arrangement and combination of the parts may be made by those skilled in the art without departure from the invention.

What I claim is:

1. An apparatus of the class described, including in combination a bearing on the end of a car, a transformer support carried by said bearing and rotatable on a vertical axis, a transformer carried directly by said support, a clamp and an extensible support between said clamp and said support, whereby the clamp may be swung with the transformer about a vertical axis to shift it from one rail to another of the track and may be shifted outward or inward from its vertical axis.

2. An apparatus of the class described, including in combination a transformer mounted rotatably about a vertical axis and a clamp mounted to rotate with said transformer and to be vertically adjustable relatively thereto.

3. An apparatus of the class described, including in combination a transformer mounted rotatably about a vertical axis and a clamp mounted to rotate with said transformer and to be adjustable horizontally relatively thereto.

4. An apparatus of the class described, including in combination a support rotatable about a vertical axis, a clamp and connecting means attached to said clamp and connected by a horizontal pivot to said support.

5. An apparatus of the class described, including in combination a support rotatable about a vertical axis, a clamp and connecting means connected by horizontal pivots to said clamp and said support respectively.

6. An apparatus of the class described, including in combination a support rotatable about a vertical axis, a clamp and extensible connecting means between said clamp and said support.

7. An apparatus of the class described, including in combination a support and arms pivotally supported thereby and adapted to carry a clamp pivoted to their outer ends.

8. An apparatus of the class described, including in combination a support and a pair of arms arranged one above the other and pivotally supported by said support so as to swing in a substantially vertical direction and adapted to carry a substantially vertical clamp pivoted to their outer ends, said arms being mounted also to swing about a vertical axis to shift said clamp from one rail to the other.

9. An apparatus of the class described, including in combination a support and a pair of arms pivotally supported thereby and adapted to carry a clamp pivoted to their outer ends, at least one of said arms being adjustable in length to vary the angle of said clamp.

10. An apparatus of the class described, including in combination a support and a pair of arms pivotally supported thereby and adapted to carry a clamp pivoted to their outer ends, both said arms being adjustable in length to vary the lateral position and the angle of said clamp.

11. An apparatus of the class described, including in combination a support and a pair of arms arranged one above the other and pivotally supported by said support so as to swing in a substantially vertical direction and adapted to carry a substantially vertical clamp pivoted to their outer ends, said arms being mounted also to swing about a vertical axis to shift said clamp from one rail to the other, and a transformer adapted for connection with the members of said clamp and adapted to turn with said arms about a vertical axis.

12. An apparatus of the class described, including in combination a support, a clamp and a pair of connecting arms each pivotally connected at one end to the clamp and at the other end to the support at vertically separated points of said clamp and said support respectively so as to secure a substantially parallel vertical motion of said clamp.

13. An apparatus of the class described, including in combination a support, a clamp, and a pair of connecting arms each pivotally connected at one end to the clamp and at the other end to the support at vertically separated points of said clamp and said support respectively so as to secure a substantially parallel vertical motion of said clamp, said support being rotatable about a vertical axis.

14. An apparatus of the class described, including in combination a support, a clamp, and a pair of connecting arms each pivotally connected at one end to the clamp and at the other end to the support at vertically separated points of said clamp and said support respectively so as to secure a substantially parallel vertical motion of said clamp, said support being rotatable about a vertical axis, and said arms being extensible in length.

15. An apparatus of the class described, including in combination a support and a clamp connected to said support and adapted to turn relatively to said support about a vertical axis.

16. An apparatus of the class described, including in combination a pair of supporting arms and a clamp carried thereby, said arms being separately extensible to permit an angular movement of the clamp.

17. An apparatus of the class described, including in combination a transformer and a clamp adapted to be swung together about a vertical axis passing through the transformer so as to avoid bodily movement of the transformer while permitting a shift of the clamp from one rail to another.

In witness whereof, I have hereunto signed my name in the presence of two subscribing witnesses.

CHARLES R. STURDEVANT.

Witnesses:
 KENNETH B. HALSTEAD,
 D. ANTHONY USINA.